(12) United States Patent
Kondo

(10) Patent No.: US 12,456,877 B2
(45) Date of Patent: Oct. 28, 2025

(54) BATTERY HAZARD DETECTION

(71) Applicant: SEMICONDUCTOR COMPONENTS INDUSTRIES, LLC, Phoenix, AZ (US)

(72) Inventor: Hideo Kondo, Oizumi-machi (JP)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 877 days.

(21) Appl. No.: 17/658,006

(22) Filed: Apr. 5, 2022

(65) Prior Publication Data

US 2023/0318333 A1 Oct. 5, 2023

(51) Int. Cl.
*H02J 7/00* (2006.01)
*G01K 3/10* (2006.01)
*G01R 31/388* (2019.01)
*G01R 31/392* (2019.01)

(52) U.S. Cl.
CPC .............. *H02J 7/0048* (2020.01); *G01K 3/10* (2013.01); *G01R 31/388* (2019.01); *G01R 31/392* (2019.01); *H02J 7/00032* (2020.01); *H02J 7/005* (2020.01); *H02J 7/0063* (2013.01)

(58) Field of Classification Search
CPC ...... H02J 7/0048; H02J 7/00032; H02J 7/005; H02J 7/0063; G01R 31/388; G01R 31/392; G01K 3/10
USPC .............. 324/431, 500, 600, 508–511, 76.11
See application file for complete search history.

(56) References Cited

U.S. PATENT DOCUMENTS

| | | | |
|---|---|---|---|
| 10,664,562 B2* | 5/2020 | Balasingam | ....... G01R 31/3842 |
| 10,948,546 B2 | 3/2021 | Kondo | |
| 10,983,168 B2 | 4/2021 | Kondo | |
| 2010/0127666 A1 | 5/2010 | Ball | |
| 2014/0249708 A1* | 9/2014 | Li | ........................... B60L 58/12 |
| | | | 701/22 |
| 2015/0162769 A1* | 6/2015 | Jestin | ....................... H02J 7/00 |
| | | | 429/61 |
| 2015/0236386 A1 | 8/2015 | Yang et al. | |
| 2017/0202595 A1 | 7/2017 | Shelton, IV | |
| 2017/0202605 A1 | 7/2017 | Whelton, IV et al. | |
| 2018/0196107 A1 | 7/2018 | Fleischer et al. | |
| 2019/0277916 A1* | 9/2019 | Sun | ................... H02J 7/007194 |
| 2019/0299942 A1* | 10/2019 | Shih | ....................... B60L 53/63 |
| 2019/0379092 A1* | 12/2019 | Schiffer | ............. H01M 10/486 |

(Continued)

*Primary Examiner* — Huy Q Phan
*Assistant Examiner* — Trung Q Nguyen
(74) *Attorney, Agent, or Firm* — Polansky & Associates, P.L.L.C.; Paul J. Polansky; Nathan H. Calvert

(57) ABSTRACT

A method, system, and integrated circuit are provided for monitoring a battery within a host device for abnormal conditions. A first temperature is determined for a battery at a first state-of-charge (SOC) of the battery during a charge action. A second temperature for the battery at a second SOC of the battery during the charge action is determined, and a current delta-SOC for the charge action is determined. A memory in the host device holding delta-SOC temperature data associated with a plurality of delta-SOCs is accessed. Based on this, a determination is made as to whether a battery temperature increase for the charge action at the current delta-SOC is abnormal, the delta-SOC temperature data including at least first data associated with a normal battery performance profile and second data associated with an abnormal battery performance profile.

20 Claims, 9 Drawing Sheets

(56) References Cited

U.S. PATENT DOCUMENTS

2020/0313245 A1\* 10/2020 Feng ................... G01R 31/396
2021/0325465 A1\* 10/2021 Kosugi ............... H02J 7/00714

\* cited by examiner

BATTERY HAZARD DETECTION

FIELD OF THE INVENTION

The disclosure relates to techniques for monitoring of hazardous charging conditions in batteries, as well as systems and integrated circuits performing such monitoring.

BACKGROUND

For battery-powered devices that use lithium-ion batteries, such as medical devices, portable devices, industrial devices, and electric vehicles, it is a strong requirement that hazardous conditions within the lithium-ion battery be detected in advance. While various failure conditions can exist within such batteries, battery aging and the associated increase in internal resistance are an important cause of failure conditions. Further, batteries with manufacturing flaws have a greater tendency for failures, which increases more quickly over time than for normal batteries.

Prior art battery techniques for monitoring hazardous conditions in a battery tend to focus on battery temperature as the main indicator of a possible hazardous condition. However, such techniques often fail to detect potentially dangerous conditions within the battery in time to prevent hazardous conditions caused by thermal runaway of a battery.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

Figure 1:
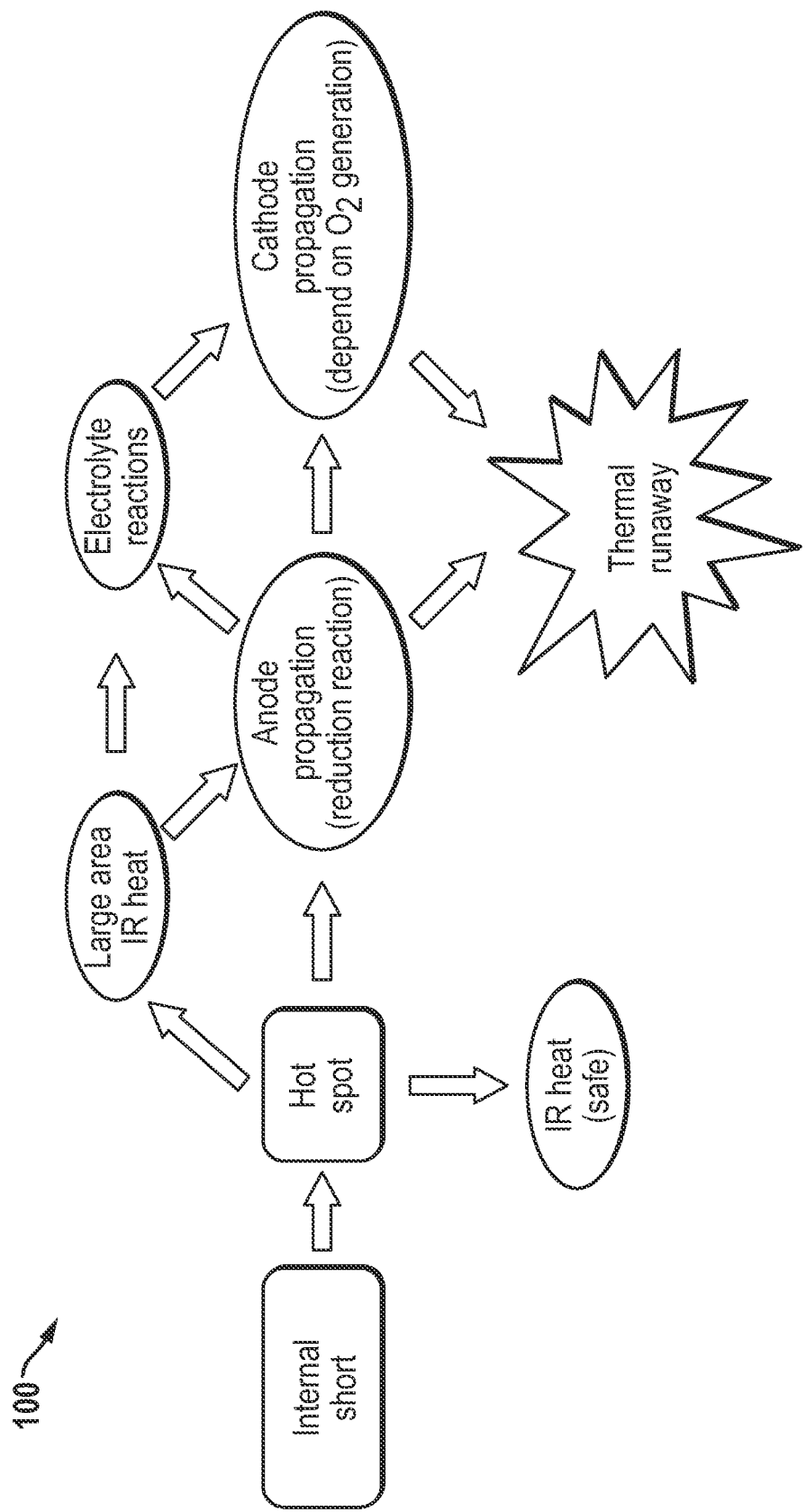
FIG. 1 illustrates in block diagram form a number of conditions which tend to cause failure in batteries.

FIG. 1 shows a block diagram of a number of conditions 100 which tend to cause failure in batteries. Generally as shown, battery failures are caused by internal shorts which result from various manufacturing flaws or aging. Such shorts create a hot spot within the battery. Such heat may be dissipated as infrared (IR) for a time, but will often cause a large area of high heat as temperatures within the battery increase to over 100° C. This results in anode propagation, a reduction reaction. Electrolyte reactions may also occur within the battery. As the heat increases, cathode propagation may also occur within the battery depending on $O_2$ generation. When anode propagation or cathode propagation occurs, thermal runaway often results within the battery due to increased power dissipation.

Figure 2B:
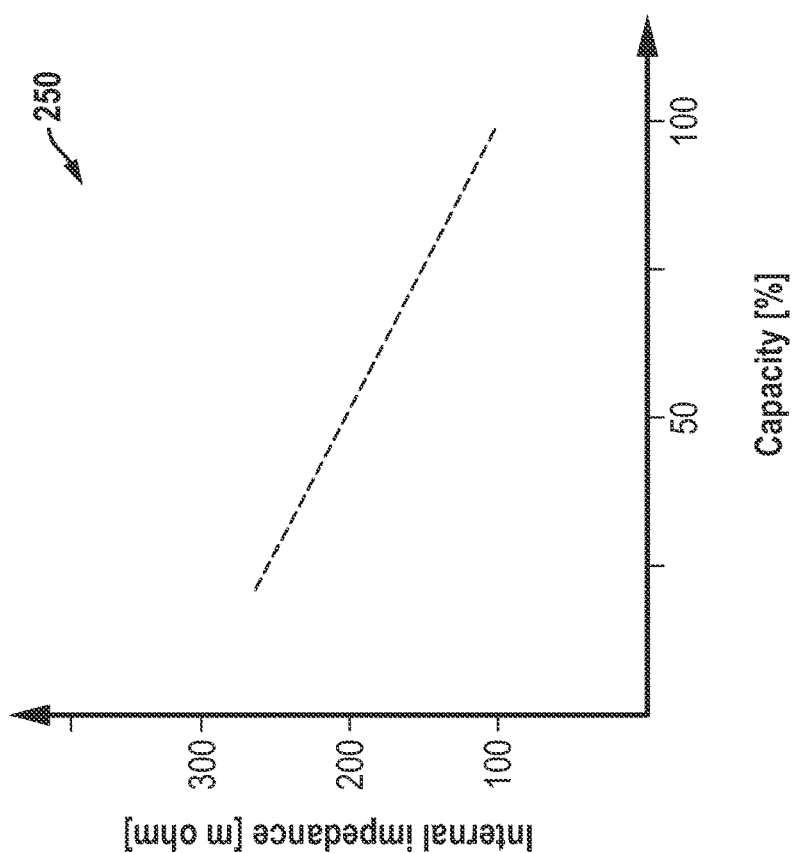
FIG. 2B shows a chart of battery capacity versus the internal resistance of a battery illustrating the capacity loss depicted FIG. 2A.
Figure 2A:
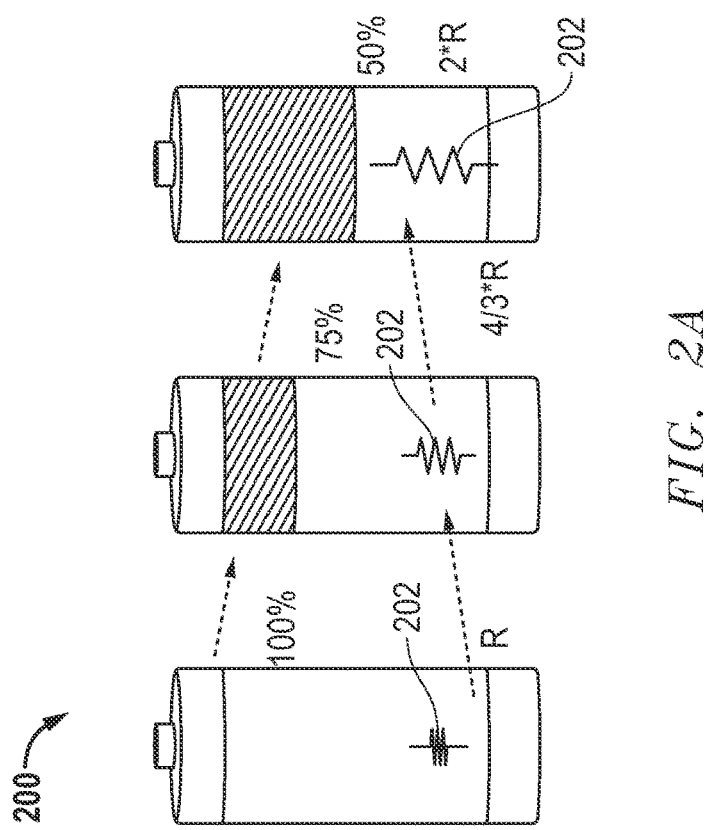
FIG. 2A illustrates in diagram form how a battery loses capacity over time.

FIG. 2A illustrates in diagram form how a battery loses capacity over time. A new battery 200 is depicted with 100% capacity. In this condition, battery 200 has a small internal resistance 202 as depicted by the small resistor symbol with a resistance of R. As the battery ages, the internal resistance increases and the battery capacity decreases. Shown in the middle is an older battery with a 75% capacity (versus the original capacity). The internal resistance 202 has increased to about 4/3*R. Finally on the right an older battery is depicted with a 50% capacity. At this age, the internal resistance 202 will have a value of about 2R.

FIG. 2B shows a chart 250 of battery capacity versus the internal resistance of a battery illustrating the capacity loss depicted FIG. 2. The internal resistance is shown on the vertical axis in milli-ohms, and the capacity is shown on the horizontal axis as a percentage. As can be seen, generally the internal resistance increases with a linear relationship as the battery capacity decreases.

Figure 3:
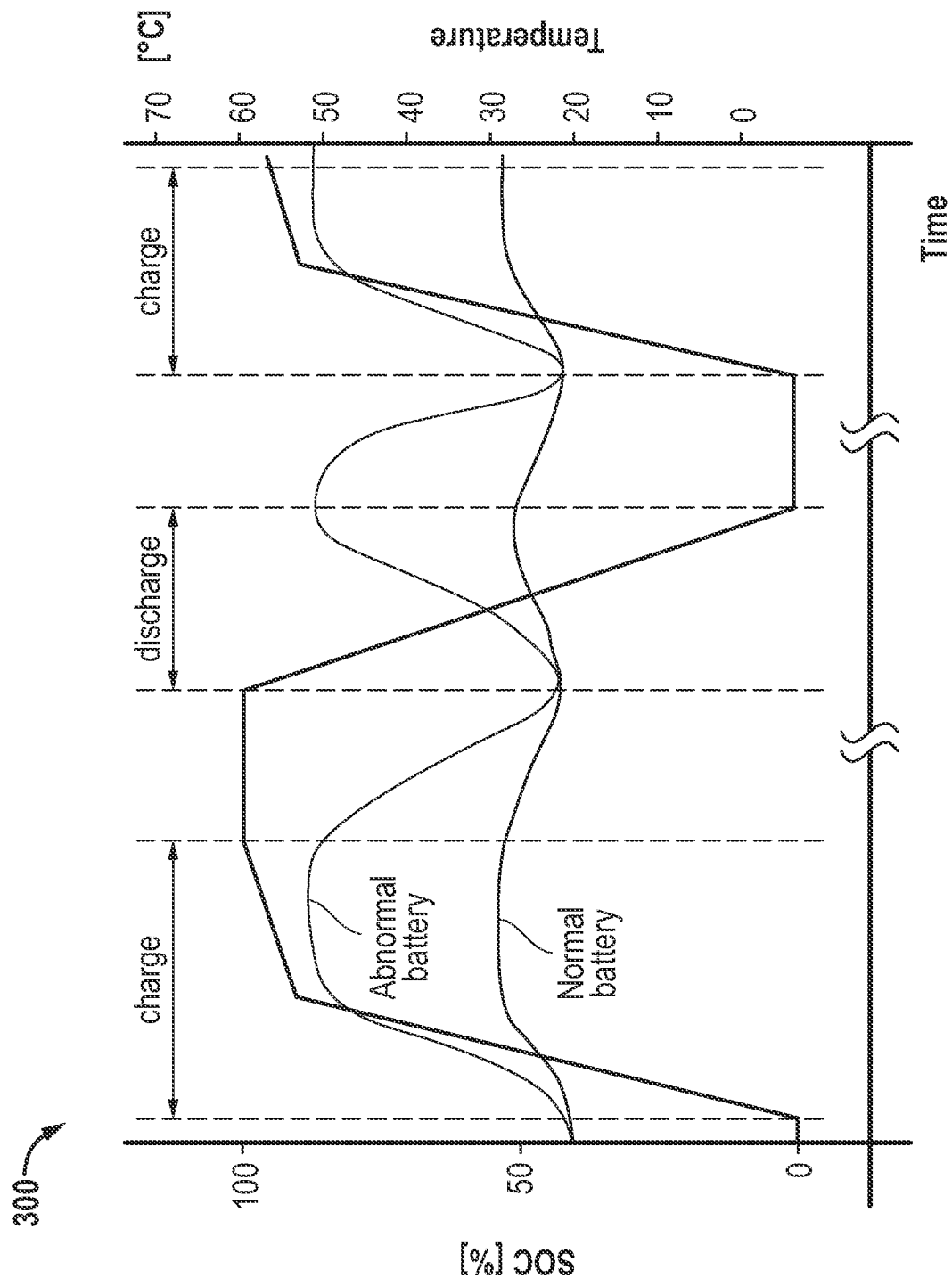
FIG. 3 shows a timing diagram depicting battery temperature change for normal and abnormal batteries during charge and discharge cycles.

FIG. 3 shows a timing diagram 300 depicting battery temperature change for normal and abnormal batteries during charge and discharge actions. The horizontal axis shows time and the vertical axis shows the state-of-charge (SOC) of the battery as a percentage, and the battery temperature. Chart 300 shows a charge action in which the SOC increases as the battery is charged, then a discharge action in which the battery supplies power to a host system, and finally another charge action. The charging mode changes from a constant current (CC) mode to a constant voltage (CV) mode at an 85% SOC which changes the rate of increase in the battery SOC.

The battery temperature for a normal battery is shown during such charge and discharge actions, and as can be seen increases from around 24 C to about 30 C during the charge action, and decreases between the charge and discharge actions with no load on the battery. During the discharge action, the normal battery temperature increases again as the SOC decreases.

The battery temperature for an abnormal battery, in this example, as can be seen increases more quickly than the normal battery during a charge action. The depicted increase, from about 24 C to 50 C, increases the risk of internal shorts and the various associated failure modes discussed with respect to FIG. 1. In the event of such failures, typically the abnormal battery exhibits further increase in temperature and may experience thermal runaway resulting in hazardous failure such as an explosion of the battery or a fire.

Figure 4:
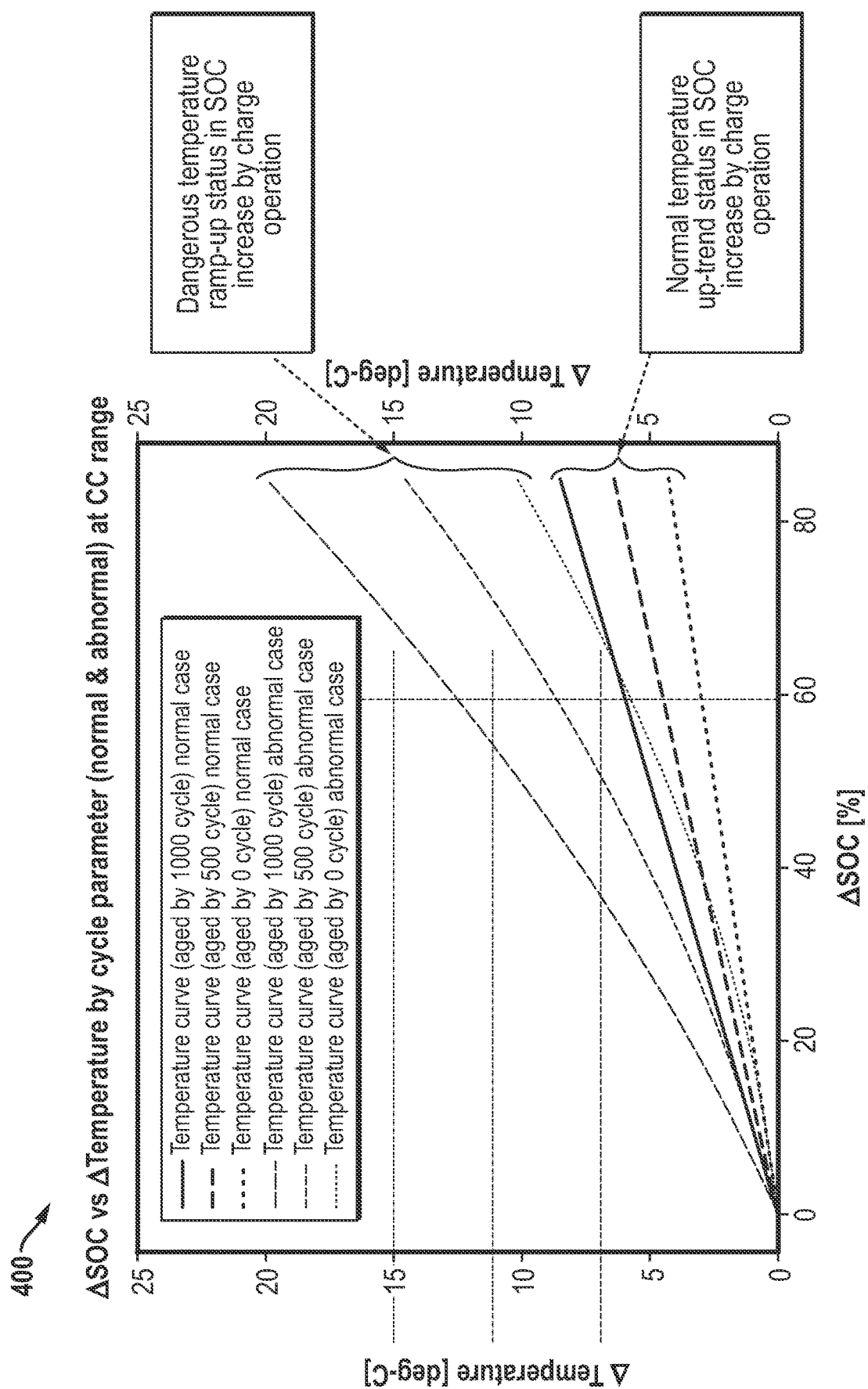
FIG. 4 shows a timing diagram of delta-state-of-charge (ΔSOC) versus temperature increase performance of a battery illustrating examples of performance for normal and abnormal batteries.

FIG. 4 shows a graph of delta-state-of-charge (ΔSOC) versus temperature increase performance of a battery illustrating examples of performance for normal and abnormal batteries. The horizontal axis shows the ΔSOC as a percentage, and the vertical axis shows the change in temperature. The graph depicts the effects of battery aging on temperature increase during a charging action.

As shown on the legend, the lower-depicted set of lines show expected temperature increase during a charge action for normal batteries having ages of zero use cycles, 500 use cycles, and 1000 use cycles. It is noted that these temperature increases (ΔTemperature) are fairly linear with respect to the ΔSOC. The older battery of age 1000 cycles has a larger temperature increase than the younger batteries, but not significantly larger.

The upper-depicted set of lines show expected temperature increases for batteries of the same three ages, but illustrating abnormal batteries for which a thermal runaway event may soon become a risk. The depicted curves are representative of battery characteristics examined by the inventors for abnormal batteries that tend to experience failures during charging. As can be seen, even the new battery for the abnormal case experiences a much higher temperature increase than the normal new battery. Importantly, the increase versus ΔSOC is seen to be non-linear, such that not only do the abnormal batteries increase in temperature faster, the increase rate increases over the charge action as the ΔSOC increases. As shown at the vertical line at a 60% ΔSOC, even the new abnormal battery has about 3 C more temperature increase than the new normal battery at a 60% ΔSOC. It is also noted that the inventors have found the depicted temperature increases are relative to the ambient temperature as measured within the housing of the host system.

Figure 5:
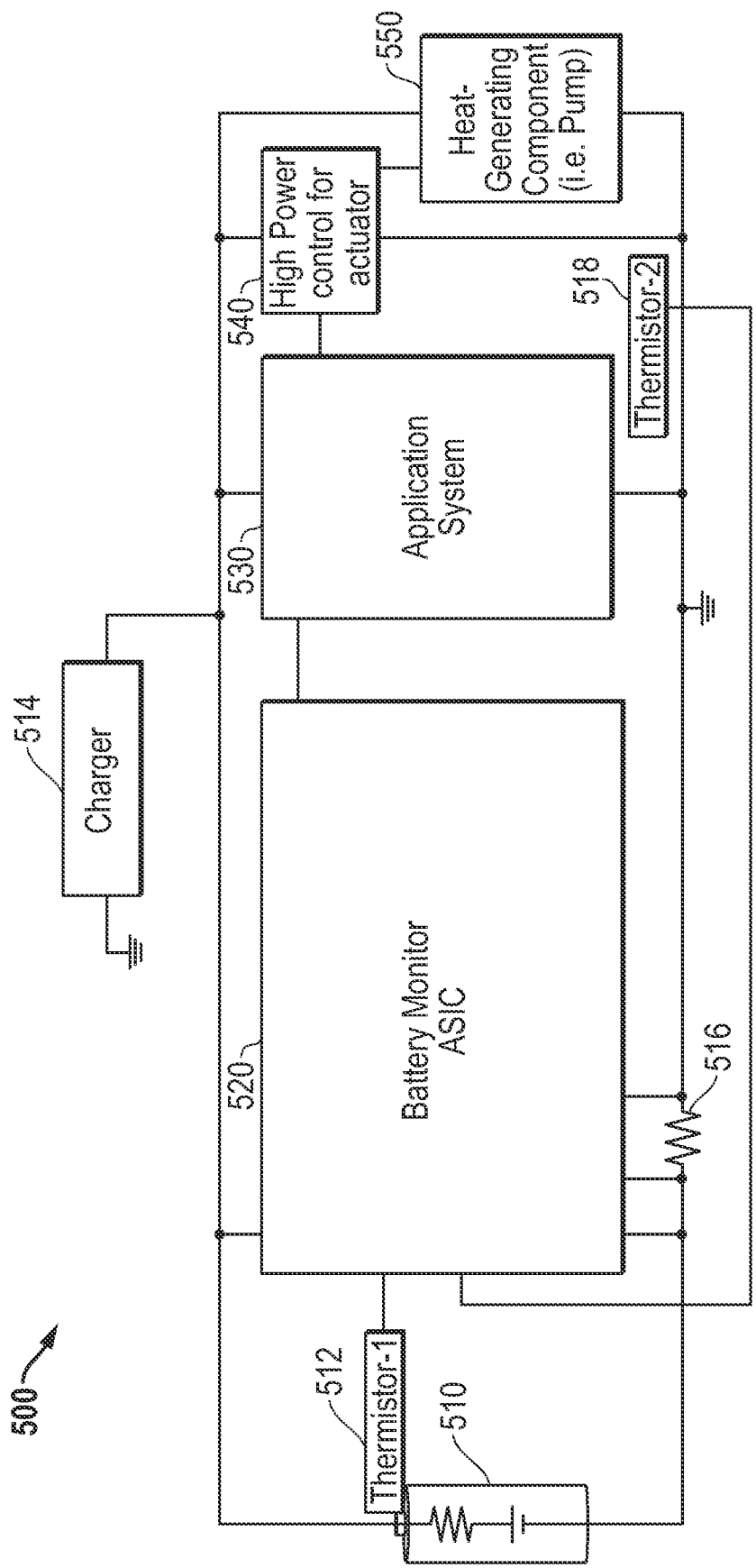
FIG. 5 illustrates in block diagram form a system including a battery monitor according to an embodiment.

FIG. 5 illustrates in block diagram form a system 500 including a battery monitor according to some embodiments. System 500 may be embodied in a portable device powered by a battery, but may also be embodied in a non-portable device with a fixed electrical supply that includes a backup battery. System 500, in this implementation, generally includes a battery 510, a charger 514, a battery monitor application-specific integrated circuit (ASIC) 520, an application system 530, a high power control circuit 540, and a heat generating component 550.

Battery 510 is a lithium battery such as a lithium-ion or lithium-polymer battery in this implementation, but batteries of other types may also be used. Battery 510 is shown an ideal voltage source in series with a resistance, and includes a positive terminal connected to a positive voltage supply rail and a negative terminal connected to a negative voltage supply rail. A thermistor 512 or other temperature sensor is thermally coupled to battery 510 for monitoring its temperature. Charger 514 includes a positive terminal connected to the positive voltage supply rail and a negative terminal connected to the negative voltage supply rail. Further, in some embodiments a separate battery protection IC may be included in the battery module which operates to disconnect the battery from the circuit in the event of thermal runaway.

Battery monitor ASIC 520 includes a first input connected to the positive terminal of battery 510, a second input connected to the negative terminal of battery 510, a third input connected to a positive terminal of a current-monitoring resistor 516, a fourth input connected to the negative terminal of current-monitoring resistor 516, a fifth input connected to an output of thermistor 512, a sixth input connected to the output of a thermistor 518, and a bidirectional connection to application system 530. While in this embodiment, charger 514 and battery monitor ASIC 520 are separate circuit modules, in some embodiments they may be integrated into a single battery controller integrated circuit (IC).

Application system 530 generally includes a microcontroller and user interface elements such as controls and displays or indicators along with their supporting electronic components and sensors. The particular components included in application system 530 are different for different applications. For example, in one embodiment in which application system 530 is an insulin pump, a glucose sensor is included application system 530. Application system 530 includes a positive power supply terminal or "rail" connected to the positive voltage supply rail terminal of battery 510, a negative power supply terminal connected to the negative terminal of battery 510, a bidirectional connection to battery monitor ASIC 520, and an output connected to high power control circuit 540.

High power control circuit 540, in this implementation, is a high power driver or motor controller for heat generating component 550, which may be a motor or pump such as a piezo-electric insulin pump. High power control circuit 540 includes a positive power supply terminal connected to the positive voltage supply rail, a negative power supply terminal connected to the negative voltage supply rail, an input connected to application system 530, and an output connected to heat generating component 550.

Heat generating component 550 includes a positive power supply terminal connected to the positive voltage supply rail, a negative power supply terminal connected to the negative voltage supply rail, and an input connected to high power control circuit 540. In the exemplary implementation herein, heat generating component 550 is a pump, but in other implementations it may be a motor or any other type of system component that tends to generate heat sufficient to affect the ambient temperature of system 500. Thermistor 518 is preferably positioned inside the housing of system 500 and proximal to heat generating component 550 for monitoring ambient temperature changes within the housing of system 500.

While the depicted system 500 includes a heat-generating component, the techniques herein are applicable to systems without such an additional component. For example, in some systems such as tablets or smartphones, the application system itself generates significant heat from components such as processors, graphics processors, and radio frequency transmitters. Many such systems can benefit from the use of battery hazard monitoring techniques herein, such as handheld battery-powered surgical tools, electric vehicles, and battery powered industrial equipment.

In operation, as application system is operated by a user and requires battery charging as depicted by the charge actions of FIG. 3. Heat generating component 550 adds heat to system 500 during operation which continues to dissipate through system 500 even following operation, and increases the ambient temperature within system 500. If system 500 is carried or worn on a user's body, body heat also affects the ambient temperature. Battery monitor ASIC 520 monitors the ambient temperature from thermistor 518, the battery temperature from thermistor 512, the battery voltage, and the battery charge current though current monitoring resistor 516, and the number of use cycles applied to the battery. Based on these inputs, and battery profile data, battery monitor ASIC 520 is able to detect hazardous conditions associated with battery charging more accurately than prior systems that employ battery temperature only based hazard detection schemes. In particular, the aging of the battery and its associated increase in internal resistance are difficult to account for in prior systems. The hazard monitoring techniques employed in battery monitor ASIC 520, as further described below, are able to better detect battery fault conditions or dangerously aged batteries in advance, in order to avoid dangerous situations such as lithium battery explosion or fire.

Figure 6:
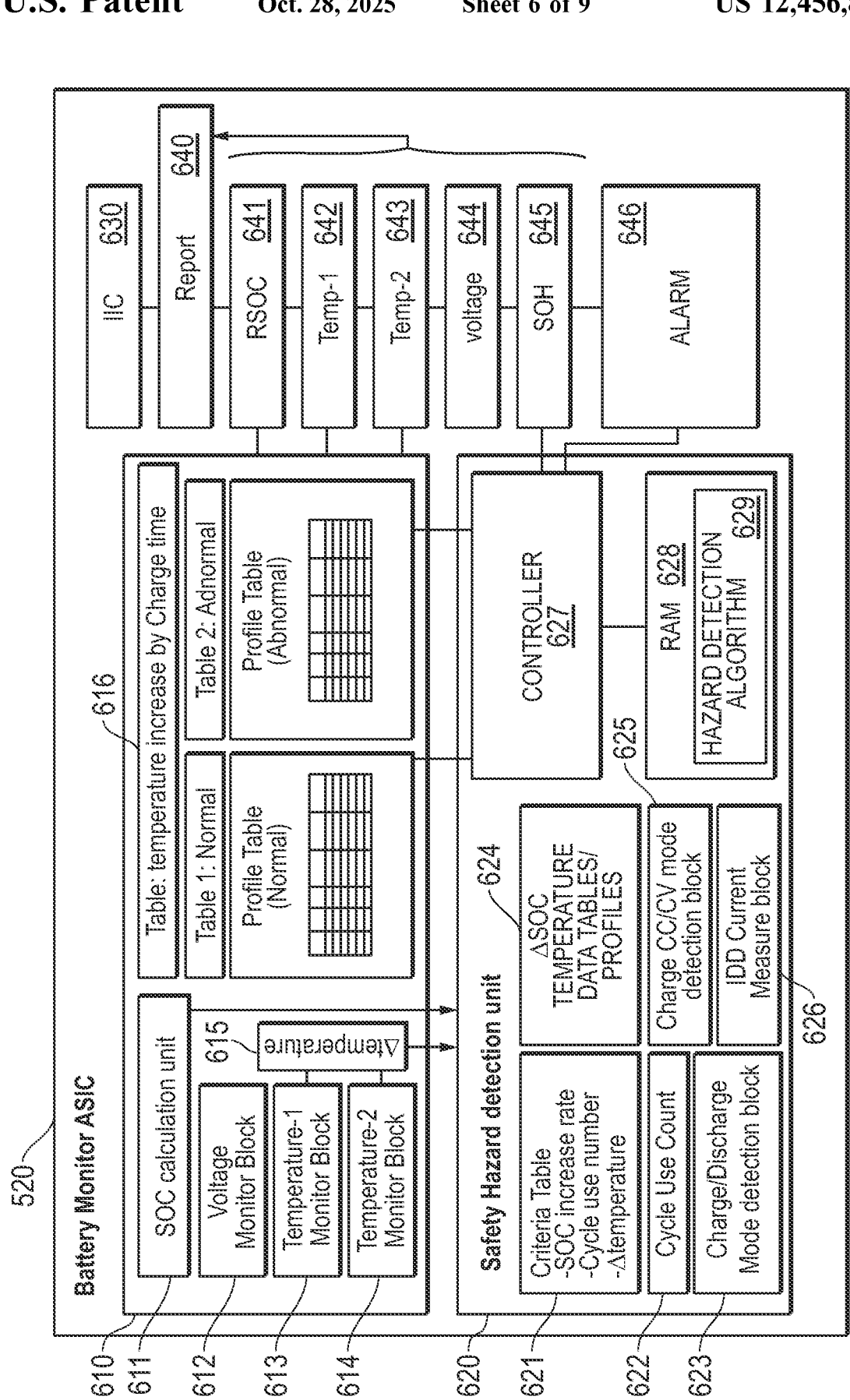
FIG. 6 illustrates in block diagram form a battery monitor application-specific integrated circuit (ASIC) according to an embodiment.

FIG. 6 illustrates in block diagram form battery monitor ASIC 520 of FIG. 5 according to some embodiments. Generally, battery monitor ASIC 520 is implemented with a mix of analog and digital circuitry, flash memory, and static random-access memory (SRAM). While an ASIC is used in this embodiment, other implementations may use a programmable logic device or other suitable integrated circuit or combination of circuits. Battery monitor ASIC 520 generally includes a battery data block 610, a safety hazard detection block 620, and an interface and set of interface and reporting circuits 630-646.

Battery data block 610 includes an SOC calculation unit 611, a voltage monitor block 612, a battery temperature monitor block 613 labeled "Temperature-1 Monitor Block", an ambient temperature monitor block 614 labeled "Temperature-2 Monitor Block", a delta-temperature ($\Delta$TEMP) calculator 615, and a set of data tables 616 held in a flash memory.

Voltage monitor block 612 receives the voltage on the positive battery terminal and converts it to a digital value for tracking the battery voltage, both during charging and discharging. Battery temperature monitor block 613 receives a signal from thermistor 512 (FIG. 5) and converts the signal to a digital temperature value to indicate the battery temperature. Similarly, ambient temperature monitor block 614 receives a signal from thermistor 518 and converts it to a digital temperature value to indicate the ambient temperature. State-of-charge (SOC) calculation unit 611 calculates a current SOC for the battery based on the received data. $\Delta$TEMP calculator 615 calculates a current $\Delta$TEMP between the battery temperature and the ambient temperature based on the temperature measurements. Data tables 616, in this implementation, include a set of $\Delta$SOC temperature data associated with a plurality of $\Delta$SOCs including data associated with a normal battery performance profile and data associated with an abnormal battery performance profile from multiple use cycle counts. In some implementations, data for a normal battery profile is not stored, and instead threshold data associated with an abnormal battery performance profile may be stored in data tables 616, as further discussed below with respect to FIG. 7.

Safety hazard detection block 620 includes a criteria table 621, cycle use counter 622, a charge/discharge mode detection block 623, a set of one or more $\Delta$SOC temperature data tables or profiles 624, a charge mode detection block 625 labeled "Charge CC/CV mode detection block", a power supply current measurement block 626 labeled "IDD Current Measure block", a controller 627, and a controller random-access memory (RAM) 628. As depicted, in operation a hazard detection algorithm 629 is loaded into controller RAM 628 for performing the hazard detection process as further described below.

Controller 627 has a connection to battery data block 610 for reading the flash memory to load hazard detection algorithm 619 and data tables 616. Controller 627 is also coupled to RAM 628 for use as system memory. Controller 627 in this embodiment is a processor core with input/output circuitry for interfacing with the various depicted components. While a processor core is used in this embodiment, other embodiments may instead employ digital logic, for example programmable logic configured with a hardware description language (HDL) such as VHDL.

Safety hazard detection block 620 also receives the $\Delta$TEMP measurement and current SOC measurements from battery data block 610. Criteria table 621 includes a number of data elements that track the current data concerning the battery. An SOC increase rate may be calculated by controller 627 or calculated by digital logic. A cycle use count is received from cycle use counter 622, and the $\Delta$TEMP is held for use by controller 627.

Power supply current measurement block 626 measures the current at current monitoring resistor 516 (FIG. 5). IDD Charge/discharge mode detection block 623 determines whether the battery is currently charging or discharging based on the power supply current measurement. This information is employed by cycle use counter 622 to track how many cycles the battery has gone through. Generally the cycle use counter 622 provides a count of charge-discharge cycles for the battery. As used herein, a charge action followed by a discharge may not necessarily, by itself, cause the cycle use counter to increase, because not all charge actions result complete charge of the battery. Typically the counter is increased after a charging and discharging occurs that adds up to a designate percentage of the battery capacity, such as 90%, 95%, or 100%. This may occur in one charge and discharging action or over multiple smaller charge and discharging actions. The particular method of tracking the cycle use count may vary, but generally this count tracks the age of the battery, with the goal of tracking complete charge and discharge cycles or their equivalent. Charge mode detection block 625 determines whether the charger is currently charging the battery in a constant current (CC) mode or a constant voltage (CV) mode.

$\Delta$SOC temperature data tables or profiles 624 holds the $\Delta$SOC temperature data associated with the type of battery used in the system for use by hazard detection algorithm 629. The entire set of $\Delta$SOC temperature data may be loaded, or only the data needed for the current use cycle count of the battery.

The interface and reporting circuits include an Inter-Integrated Circuit (IIC or I2C) bus interface 630, a report block 640, a relative state-of-charge (RSOC) register 641, a battery temperature register 642 labeled "Temp-1", an ambient temperature register 643 labeled "Temp-2", a voltage register 644 for holding the current battery voltage, a state-of-health (SOH) register 645 for holding a current SOH indication for the battery, typically as a percentage of the original capacity, and an alarm register 646 for indicating whether an alarm is activated for a hazardous battery condition.

IIC bus interface 630 is for connecting with application system 530 (FIG. 5). IIC bus interface 630 is used to load software to battery monitor ASIC 520, to load $\Delta$SOC temperature data for specific battery types installed in the system, and to report battery charge and hazard conditions back to application system 530.

Report block 640 contains digital logic for reporting the values of registers 641-646 over IIC bus interface 630 to application system 530.

While this particular hardware design is given as an example, it should be apparent after appreciating this description that various other implementations can use different hardware to achieve the battery monitoring functionality discussed below. For example, a purely microcontroller-based implementation may be used in which a controller performs all the functions discussed after measurements are digitized and fed to the controller. Further, as discussed above, in some implementations, programmable logic may be employed using a HDL.

In operation, when a new battery is installed and the application system is turned on, the battery is recognized either automatically by various digital identifiers (not shown) or by electrical characteristics, or a battery type is manually entered. The battery monitor ASIC then checks if it has ΔSOC temperature data corresponding to the battery in its flash memory, and if not, requests and receives an updated version of the ΔSOC temperature from application system 530. The device also has the ability to update from an external device communicatively coupled to application system 530, for example over a USB link, which then updates the memory of battery monitor ASIC 520 with the updated version of the ΔSOC temperature data. The cycle use count is then reset for the new battery and safety hazard detection unit 620 then monitors the batteries charge and discharge cycles and operates the hazard detection algorithm, as further described below.

Figure 7:
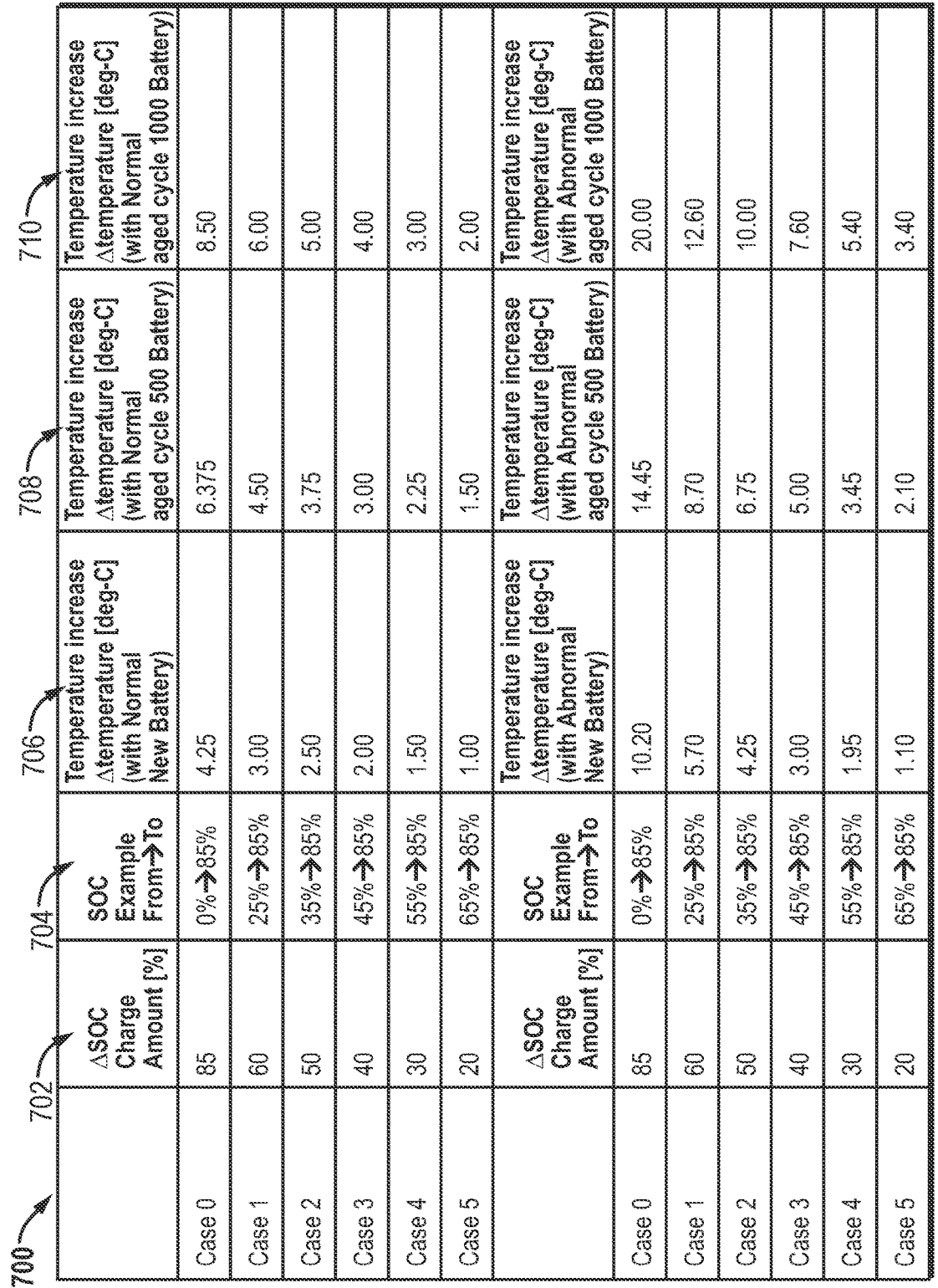
FIG. 7 shows a table including a set of ΔSOC temperature data useful in the hazard detection techniques disclosed herein.

FIG. 7 shows a table 700 including a set of ΔSOC temperature data associated with a plurality of ΔSOCs including data associated with a normal battery performance profile and data associated with an abnormal battery performance profile from multiple use cycle counts according to some embodiments. Table 700 includes a number of rows including ΔSOC temperature data, and includes at least first data associated with a normal battery performance profile for a plurality of cycle use counts, shown in the upper half of table 700, and second data associated with an abnormal battery performance profile for the plurality of cycle use counts, shown in the bottom half of table 700. The particular format of the data, including whether it is a table or other data structure, is not important. For example, in a typical implementation, a single row for each case is used including all the relevant data.

In table 700, the first column listing case numbers "Case 0"— "Case 5" is for reference to the rows and is not needed in the actual data. Column 702 shows the ΔSOC expressed as a charge amount in percentage. For example, at Case 0 ΔSOC temperature data for a ΔSOC of 85% is included. Column 704 shows an example of the SOC difference that might achieve such a ΔSOC. The data in column 704 is not necessary for implementing the process and is depicted for explanation purposes only. For example, a ΔSOC of 85% may result from a battery charging from 0% to 85% as shown, or from a battery charging from 10% to 95%, or any other 85% charge increase.

Column 706 shows the ΔSOC temperature data including associated with a normal battery performance profile and an abnormal battery performance profile for a new battery that has not gone through multiple use cycles. Column 708 shows the ΔSOC temperature data including associated with a normal battery performance profile and an abnormal battery performance profile for a battery that has had 500 use cycles. Column 710 shows the ΔSOC temperature data including associated with a normal battery performance profile and an abnormal battery performance profile for a battery that has had 1000 use cycles.

While data is shown in table 700 for three use cycle counts, in other implementations finer granularity of data is used, such as data for every 100 use cycles, or every 200 use cycles. Furthermore, while the depicted data is showed as ΔTEMP amounts associated with respective ΔSOCs, in various implementations the data may take on other forms. For example, an equation may be provided for each desired battery age (use cycle count) representing a minimum threshold to identify an abnormal performance profile. Such equations are produced, for example, by curve fitting to the abnormal ΔSOC versus ΔTEMP performance curves depicted in FIG. 4 for each desired age, or some desired curve underneath the abnormal performance curve to provide a threshold between the normal and abnormal performance curves. An equation including the cycle count may also be employed, produced similarly by fitting a surface to data such as that in FIG. 4 with use cycle count representing a third dimension in the data. Those of skill in the art can understand, based on this specification, that suitable data can be stored or represented in a variety of forms. Furthermore, while table 700 shows data stored for both normal and abnormal ΔSOC versus ΔTEMP performance, in some embodiments only a threshold for abnormal performance is needed for each ΔSOC at each desired age.

Figure 8:
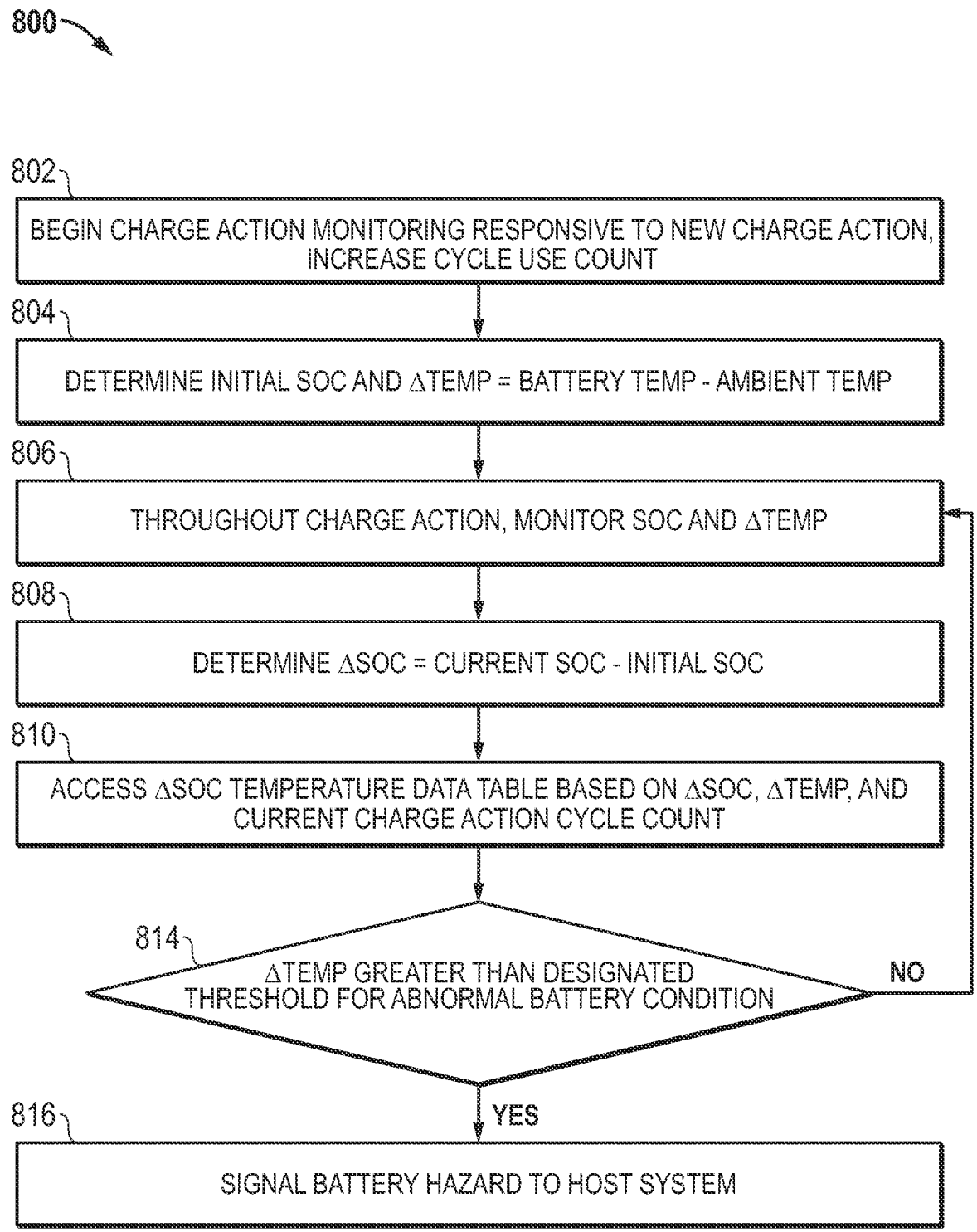
FIG. 8 shows a flowchart of a process for monitoring a battery during a charge action according to some embodiments.

FIG. 8 shows a flowchart 800 of a process for monitoring a battery during a charge action according to some embodiments. The process is suitable for performance by the battery monitor ASIC of FIG. 6, or other suitable battery monitoring circuits, for monitoring a battery for unsafe charging conditions during a charge action.

The process begins at block 802 where a new charge action is begun on a battery, and responsive to the new charge action, the process determines whether to update At block 804, the process determines an initial temperature for the battery at a first SOC of the battery during the charge action. This determination may be at the beginning of the charge action or at a selected time after the beginning. An initial SOC is determined for the battery, typically based on the battery voltage with open circuit condition which including a no-load and no-charge condition for the battery. An initial temperature difference is also determined for the battery based on measuring the battery temperature. In a preferred embodiment as shown, the ambient temperature is also measured and a delta-temperature labeled "ΔTEMP" is calculated as the difference between the battery temperature and the ambient temperature.

At block 806, the process continues to monitor the battery as the charge action continues. Additional measurements are made of the battery temperature, and preferably of the ΔTEMP including the ambient temperature as shown at block 808. Such measurements may be made on a periodic basis during the charge action, or at designated SOC levels or ΔSOC amounts as the charge action continues. Block 808 includes determining a current ΔSOC for the battery, which is calculated by subtracting the initial SOC from the current SOC.

At block 810, the process includes accessing a memory in the host device holding ΔSOC temperature data associated with a plurality of ΔSOCs. The ΔSOC temperature data includes at least first data associated with a normal battery performance profile and second data associated with an abnormal battery performance profile. At block 814, the process determines whether a battery temperature increase for the charge action at the current ΔSOC is abnormal. In this implementation, such a determination includes is also based on a Cycle Use Count from cycle use counter 622 (FIG. 6) for the battery. For example, the process uses the Cycle Use Count to select a data set from the ΔSOC temperature data corresponding to the Cycle Use Count of the battery. In the exemplary data of FIG. 7, for example, if Cycle Use Count were 520 cycles, the process accesses the performance profiles labelled "aged cycle 500 battery". The current ΔTEMP is compared to the ΔSOC temperature data in the selected profile for the current ΔSOC.

At block 814, if the current ΔTEMP is less than the abnormal ΔTEMP in the profile, the process determines the charge action is normal, and the process returns to block 806 to continue monitoring the charge action. If the current ΔTEMP is equal to or greater than the abnormal ΔTEMP in the profile, the process determines the charge action is abnormal. In such case, the process goes to block 816 where the battery monitor ASIC signals to the host system that there is a potential battery charging hazard. Block 814 may also include a comparison to the normal battery profile to determine if the current ΔTEMP is below a normal expected temperature rise for the current charge action.

Figure 9:
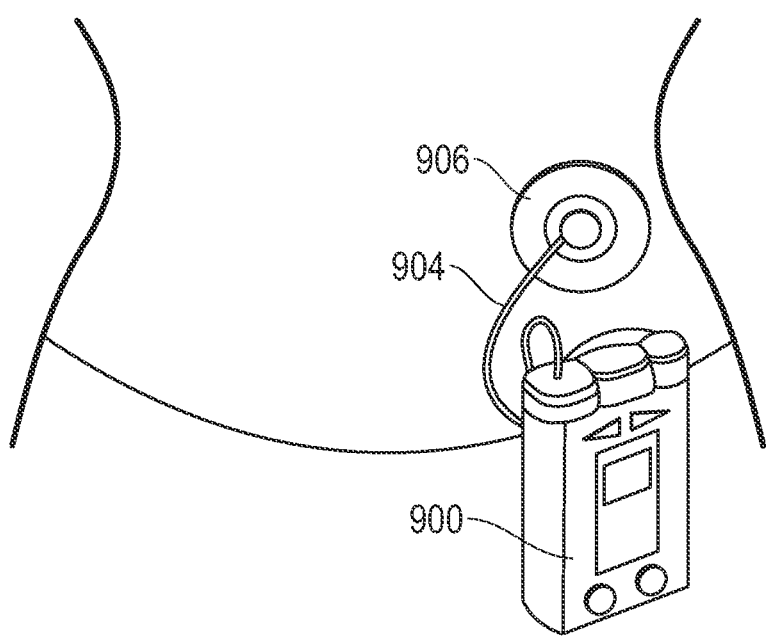
FIG. 9 is a perspective view of a medical device including the battery monitor ASIC of FIG. 5 according to an embodiment.

FIG. 9 is a perspective view of a medical device 900 including the battery monitor ASIC of FIG. 5 according to some embodiments. In the depicted implementation, medical device 900 is an insulin pump including a housing holding the various electronics and battery as shown in FIG. 5, tubing 904, and an infusion set 906 for supplying insulin to the depicted patient. While a medical device is shown in this embodiment, the techniques herein provide battery safety advantages for a wide variety of devices that employ batteries such as lithium-ion batteries. They are particularly advantageous to devices that are worn on the human body or carried, such as various medical monitors and phones, but may be used with non-portable devices as well. Further, the techniques herein are advantageous for devices which include components that generate significant heat inside the device, such as a pump and its associated power electronics.

Thus, various embodiments of a battery monitor circuit, an apparatus including such a battery monitor, and a corresponding method have been described. The various embodiments provide hazard monitoring for a battery. Known techniques of tracking battery aging and failure can be inaccurate and increase risk of catastrophic failures. Embodiments of the present disclosure improve the monitoring accuracy by monitoring the battery temperature during charge actions, and detecting abnormal temperature ramp-up for designated changes in the battery state-of-charge, comparing the temperature increase against data indicating abnormal battery performance.

The above-disclosed subject matter is to be considered illustrative, and not restrictive, and the appended claims are intended to cover all such modifications, enhancements, and other embodiments that fall within the true scope of the claims. For example, the ΔSOC data may be stored in various forms. As another example, while measuring the battery temperature and ambient temperature is preferred in order to properly attribute temperature changes to charging action, in some embodiments where ambient temperature is not expected to change significantly, the ambient temperature is not measured and the temperature changes are based only on battery temperature readings.

Thus, to the maximum extent allowed by law, the scope of the present invention is to be determined by the broadest permissible interpretation of the following claims and their equivalents, and shall not be restricted by the forgoing detailed description.

What is claimed is:

1. A method of monitoring a battery within a host device for abnormal conditions, comprising:
at an integrated circuit, receiving a first measurement of a first temperature for a battery at a first state-of-charge (SOC) of the battery during a charge action;
at the integrated circuit, receiving a second measurement of a second temperature for the battery at a second SOC of the battery during the charge action;
at the integrated circuit, determining a current delta-SOC for the charge action; and
at the integrated circuit, accessing a memory in the host device holding delta-SOC temperature data associated with a plurality of delta-SOCs, the delta-SOC temperature data including at least first data associated with a normal battery performance profile and second data associated with an abnormal battery performance profile;
at the integrated circuit, determining whether a battery temperature increase for the charge action at the current delta-SOC is abnormal by comparing the battery temperature increase to the delta-SOC temperature data; and
at the integrated circuit, responsive to determining that the battery temperature increase is abnormal, initiating a safety action to prevent thermal runaway in the battery.

2. The method of claim 1, wherein determining the first and second temperatures for the battery is performed relative to an ambient temperature measured inside a host system including a heat-generating component.

3. The method of claim 1, wherein:
determining whether the charge action is abnormal is also based on cycle use count of the battery; and
the delta-SOC temperature data includes at least first data associated with a normal battery performance profile for a plurality of cycle use counts and second data associated with an abnormal battery performance profile for the plurality of cycle use counts of the battery.

4. The method of claim 1, wherein:
the memory holds multiple delta-SOC temperature data tables each associated with a respective one of multiple types of batteries; and
accessing the memory includes selecting one of the multiple delta-SOC temperature data tables is performed based on a type of the battery.

5. The method of claim 1, further comprising:
receiving an updated version of the delta-SOC temperature data associated with a plurality of delta-SOCs from an external device communicatively coupled to the host device; and
updating the memory with the updated version of the delta-SOC temperature data.

6. The method of claim 1, wherein the delta-SOC temperature data includes data for at least a first delta-SOC having at least a 50% charge increase for both the normal battery performance profile and the abnormal battery performance profile, and a second delta-SOC having at least a 60% charge increase for both the normal battery performance profile and the abnormal battery performance profile.

7. The method of claim 6, wherein the delta-SOC temperature data further includes data for a third delta-SOC of less than 50% for both the normal battery performance profile and the abnormal battery performance profile.

8. The method of claim 1, wherein the method is performed on an application-specific integrated circuit (ASIC) located in a host system including the battery.

9. An integrated circuit (IC) for monitoring a battery in a host device comprising:
a first input for receiving temperature signal associated with a battery temperature;
a second input receiving a battery voltage;
a memory; and
a hazard detection circuit operable to:

determine a first temperature for a battery at a first state-of-charge (SOC) of the battery during a charge action;

determine a second temperature for the battery at a second SOC of the battery during the charge action;

determine a current delta-SOC for the charge action;

determine a battery temperature increase for the charge action at the current delta-SOC based on the first temperature and the second temperature;

access the memory holding delta-SOC temperature data associated with a plurality of delta-SOCs, the delta-SOC temperature data including at least first data associated with a normal battery performance profile and second data associated with an abnormal battery performance profile;

determine whether the battery temperature increase for the charge action at the current delta-SOC is abnormal by comparing the battery temperature increase to the delta-SOC temperature data; and responsive to determining that the battery temperature increase is abnormal, initiate a safety action to prevent thermal runaway in the battery.

10. The IC of claim 9, wherein:
the IC further comprises a battery cycle use counter; and
the hazard detection circuit further determines whether the charge action is abnormal based on a current value of the battery cycle use counter.

11. The IC of claim 9, wherein the current delta-SOC is determined relative to a current charge capacity of the battery.

12. The IC of claim 9, wherein determining the first and second temperatures for the battery is performed relative to an ambient temperature measured inside a host system including a heat-generating component.

13. The IC of claim 9, wherein:
the delta-SOC temperature data includes at least first data associated with a normal battery performance profile for a plurality of cycle use counts and second data associated with an abnormal battery performance profile for the plurality of cycle use counts.

14. An apparatus comprising:
a portable device including a battery, an application system powered by the battery, and at least one heat-generating component powered by the battery; and
a battery monitor circuit including a first temperature sensor thermally coupled to the battery for providing a battery temperature, a second temperature sensor for providing an ambient temperature, a voltage monitor for measuring a battery voltage, a non-volatile memory; and
a hazard detection circuit, wherein the hazard detection circuit is operable to:

determine a first temperature for a battery at a first state-of-charge (SOC) of the battery during a charge action;

determine a second temperature for the battery at a second SOC of the battery during the charge action;

determine a current delta-SOC for the charge action;

access a memory holding delta-SOC temperature data associated with a plurality of delta-SOCs and determine whether a battery temperature increase for the charge action at the current delta-SOC is abnormal, the delta-SOC temperature data including at least first data associated with a normal battery performance profile and second data associated with an abnormal battery performance profile; and responsive to determining that the battery temperature increase is abnormal, initiate a safety action to prevent thermal runaway in the battery.

15. The apparatus of claim 14, wherein:
the battery monitor circuit includes a battery cycle use counter coupled to a current monitoring circuit adapted to measure current through the battery; and
the hazard detection circuit determines whether the charge action is abnormal is also based on a cycle use count of the battery.

16. The apparatus of claim 14, wherein the current delta-SOC is determined relative to a current charge capacity of the battery.

17. The apparatus of claim 14, wherein the delta-SOC temperature data includes data for at least a first delta-SOC having at least a 50% charge increase for both the normal battery performance profile and the abnormal battery performance profile, and a second delta-SOC having at least a 60% charge increase for both the normal battery performance profile and the abnormal battery performance profile.

18. The apparatus of claim 14, wherein:
the memory holds multiple delta-SOC temperature data tables each associated with a respective one of multiple types of batteries; and
accessing the memory includes selecting one of the multiple delta-SOC temperature data tables is performed based on a type of the battery.

19. The apparatus of claim 14, wherein the apparatus is further operable to:
communicatively couple to an external device and receive an updated version of the delta-SOC temperature data associated with a plurality of delta-SOCs; and
update the memory with the updated version of the delta-SOC temperature data.

20. The apparatus of claim 19, wherein the apparatus is a medical device adapted to be worn on a patient's body.

* * * * *